United States Patent
Smith et al.

(10) Patent No.: US 12,394,112 B2
(45) Date of Patent: Aug. 19, 2025

(54) TECHNIQUES FOR PRELOADING AND DISPLAYING HIGH QUALITY IMAGE DATA BASED ON MOVEMENT

(71) Applicant: Universal City Studios LLC, Universal City, CA (US)

(72) Inventors: John David Smith, Orlando, FL (US); Akiva Meir Krauthamer, Orlando, FL (US); Justin Allen Hare, Windermere, FL (US)

(73) Assignee: UNIVERSAL CITY STUDIOS LLC, Universal City, CA (US)

(*) Notice: Subject to any disclaimer, the term of this patent is extended or adjusted under 35 U.S.C. 154(b) by 0 days.

(21) Appl. No.: 18/386,744

(22) Filed: Nov. 3, 2023

(65) Prior Publication Data

US 2024/0062434 A1    Feb. 22, 2024

Related U.S. Application Data

(63) Continuation of application No. 17/200,255, filed on Mar. 12, 2021, now Pat. No. 11,816,758.
(Continued)

(51) Int. Cl.
*G06T 11/00* (2006.01)
*G06T 1/60* (2006.01)
*H04L 67/131* (2022.01)

(52) U.S. Cl.
CPC ............... *G06T 11/00* (2013.01); *G06T 1/60* (2013.01); *H04L 67/131* (2022.05); *G06T 2210/36* (2013.01)

(58) Field of Classification Search
None
See application file for complete search history.

(56) References Cited

U.S. PATENT DOCUMENTS

| 3,868,173 A | 2/1975 | Miles et al. |
| 7,133,041 B2 | 11/2006 | Kaufman et al. |

(Continued)

FOREIGN PATENT DOCUMENTS

| JP | H06176131 A | 6/1994 |
| JP | 3779869 B2 | 5/2006 |

(Continued)

OTHER PUBLICATIONS

PCT/US2021/023990 International Search Report and Written Opinion mailed Jul. 7, 2021.
(Continued)

*Primary Examiner* — Jason A Pringle-Parker
(74) *Attorney, Agent, or Firm* — Fletcher Yoder, P.C.

(57) ABSTRACT

A system may have one or more processors and a memory storing instructions, that when executed by the processors, cause the processors to perform operations that include receiving data associated with a user, and determining that the received data corresponds to a direction of movement by the user through a virtual reality (VR) environment, augmented reality (AR) environment, or mixed reality (MR) environment. The operations may also include transmitting a tile of high quality image data to a display device based on the direction of movement by the user, transmitting a command to the display device to display one or more aspects of a region of the VR environment, the AR environment, or the MR environment based on the tile of high quality image data, and preloading one or more additional tiles of high quality image data into a preloader based on the tile of high quality image data.

20 Claims, 3 Drawing Sheets

Related U.S. Application Data

(60) Provisional application No. 63/002,056, filed on Mar. 30, 2020.

(56) References Cited

U.S. PATENT DOCUMENTS

| | | | |
|---|---|---|---|
| 8,908,058 B2 | 12/2014 | Akeley et al. | |
| 9,690,375 B2 | 6/2017 | Blum et al. | |
| 9,874,749 B2 | 1/2018 | Bradski et al. | |
| 10,062,414 B1 | 8/2018 | Westphal | |
| 10,078,913 B2 | 9/2018 | Rondao Alface et al. | |
| 10,419,738 B1 | 9/2019 | Phillips et al. | |
| 2005/0017924 A1 | 1/2005 | Utt et al. | |
| 2010/0173561 A1 | 7/2010 | Tseng | |
| 2013/0222369 A1 | 8/2013 | Huston et al. | |
| 2015/0175031 A1* | 6/2015 | Henderson | H02K 7/09 180/65.8 |
| 2015/0277710 A1 | 10/2015 | Lee et al. | |
| 2015/0288914 A1 | 10/2015 | Minneman et al. | |
| 2017/0072316 A1* | 3/2017 | Finfter | A63F 13/573 |
| 2017/0225084 A1* | 8/2017 | Snyder | A63G 7/00 |
| 2017/0316543 A1 | 11/2017 | Pieters et al. | |
| 2017/0358120 A1 | 12/2017 | Ambrus et al. | |
| 2018/0089899 A1 | 3/2018 | Piemonte et al. | |
| 2018/0174619 A1 | 6/2018 | Roy et al. | |
| 2018/0302630 A1 | 10/2018 | Copley et al. | |
| 2018/0310025 A1 | 10/2018 | Keränen et al. | |
| 2019/0094540 A1 | 3/2019 | Greenwood et al. | |
| 2019/0212569 A1 | 7/2019 | Ohyama | |
| 2020/0050884 A1 | 2/2020 | Han et al. | |

FOREIGN PATENT DOCUMENTS

| | | |
|---|---|---|
| JP | 2012033038 A | 2/2012 |
| JP | 2020501465 A | 1/2020 |

OTHER PUBLICATIONS

JP Office Action for Japanese Application No. 2022-559633 mailed Dec. 23, 2024.

* cited by examiner

TECHNIQUES FOR PRELOADING AND DISPLAYING HIGH QUALITY IMAGE DATA BASED ON MOVEMENT

CROSS-REFERENCE TO RELATED APPLICATION

The present disclosure is a continuation of and claims priority to and benefit of U.S. patent application Ser. No. 17/200,255 entitled "TECHNIQUES FOR PRELOADING AND DISPLAYING HIGH QUALITY IMAGE DATA," filed Mar. 12, 2021, which claims priority to and benefit of U.S. Provisional Application Ser. No. 63/002,056, entitled "TECHNIQUES FOR PRELOADING AND DISPLAYING HIGH QUALITY IMAGE DATA", filed Mar. 30, 2020, the entireties of which are incorporated by reference into the present disclosure.

BACKGROUND

The present disclosure relates generally to displaying image data in a virtual reality environment, an augmented reality environment, or a mixed reality environment. More specifically, the present disclosure relates to an imaging system that may preload image data to facilitate displaying certain aspects of one or more regions of the virtual reality environment, the augmented reality environment, or the mixed reality environment on a display device.

As new imaging techniques are developed, higher quality images or video may be generated and subsequently displayed to a user within a virtual reality ("VR") environment, an augmented reality ("AR") environment, or a mixed reality ("MR") environment via a display device. However, these higher quality images or video may have very large file sizes because of the amount of data in each image or video. As such, displaying the VR/AR/MR environments provided by such image files or video files generated from high quality imaging techniques at a large scale may involve large amounts of computing resources (e.g., terabytes or more) that may be cost-prohibitive or resource-prohibitive.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may have one or more processors and a memory storing instructions, that when executed by the processors, cause the processors to perform operations that include receiving data associated with a user and determining that the received data corresponds to a direction of movement by the user through a virtual reality (VR) environment, augmented reality (AR) environment, or mixed reality (MR) environment. The operations may also include transmitting a tile of high quality image data to a display device based on the direction of movement by the user, transmitting a command to the display device to display one or more aspects of a region of the VR environment, the AR environment, or the MR environment based on the tile of high quality image data, and preloading one or more additional tiles of high quality image data into a preloader based on the tile of high quality image data.

In another embodiment, a method may include receiving, via one or more processors, data associated with a user from one or more input devices, one or more sensors, or both, and determining, via the processors, that the received data corresponds to a direction of movement by the user through a virtual reality (VR) environment, augmented reality (AR) environment, or mixed reality (MR) environment. The method may also include transmitting, via the processors, one or more high quality image data files to a display device based on the direction of movement by the user, transmitting, via the processors, a command to the display device to display one or more virtual objects of a region of the VR environment, the AR environment, or the MR environment based on the one or more high quality image data files transmitted to the display device, and preloading, via the processors, one or more additional high quality image data files into a preloader based on the direction of movement by the user.

In another embodiment, a non-transitory, computer-readable medium, contains instructions that when executed by one or more processors, cause the processors to perform operations that includes receiving data associated with a user from one or more input devices, one or more sensors, or both, and determining that the received data corresponds to a particular direction in a visual field of the user in a virtual reality (VR) environment, augmented reality (AR) environment, or mixed reality (MR) environment. The operations also include transmitting a tile of high quality image data to a display device based on the particular direction in the visual field of the user, transmitting a command to the display device to display one or more aspects of a region of the VR environment, the AR environment, or the MR environment based on the tile of high quality image data, and preloading one or more additional tiles of high quality image data into a preloader based on the tile of high quality image data transmitted to the display device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
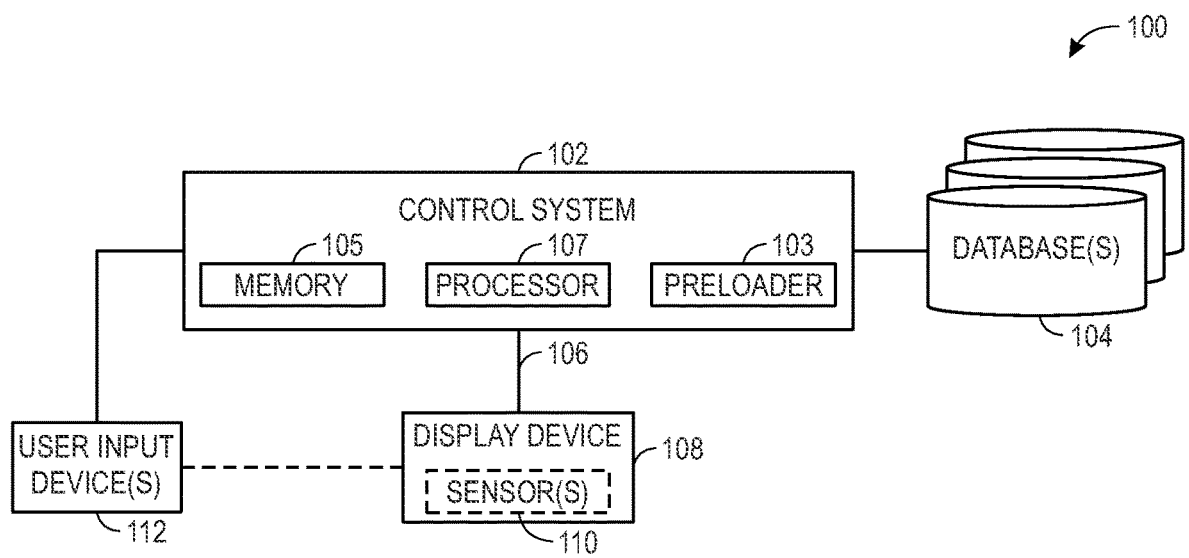
FIG. 1 illustrates a block diagram of an imaging system that preloads high quality image data corresponding to one or more regions of a virtual reality (VR) environment, an augmented reality (AR) environment, or a mixed reality (MR) environment, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, high quality images or video may be generated from various imaging techniques and subsequently displayed to a user within a virtual reality ("VR") environment, an augmented reality ("AR") environment, or a mixed reality ("MR") environment via a display device. Such high quality imaging techniques may include techniques in light field technology, point cloud modeling, voxelization, and so forth. Through the use of image files or video files generated from these techniques and subsequently displayed to the user, the user may be able to perceive a level of detail in digitally presented objects in VR/AR/MR environments similar to the level of detail typically perceived by the user in the real world. For example, a light field volume may be generated by capturing one or more images of a real-world object that include brightness values and color values of each light ray received by an image sensor as well as the direction and/or the angle of each light ray received by the image sensor. In this way, the light field volume may contain sub-images that slightly differ from each other based on the direction and/or the angle of each light ray associated with the sub-image. Based on a desired focus depth or a desired perspective of the object, the light field volume may be processed to produce a two-dimensional ("2D") image or a three-dimensional ("3D") image of the object that corresponds to the desired focus depth or the desired perspective. In this way, images or videos generated from light field technology may be displayed in VR/AR/MR environments to provide the user with a similar perspective of an object in the VR/AR/MR environments as the user would have of the object in the real world.

However, due to the amount of image data in each light field volume, image files or video files providing light field volumes are very large (e.g., a terabyte or more). Similarly, sizes of image files and video files generated via point cloud modeling, voxelization, and other high quality imaging techniques may also be very large. As such, use of such files generated from high quality imaging techniques to display VR/AR/MR environments at a large scale may involve large amounts of computing resources that may be cost-prohibitive or resource-prohibitive. For example, in an interactive ride setting in which a user may move around within a VR/AR/MR environment and the visual field of the user may change within the VR/AR/MR environment, multiple high quality image files may be loaded to display a scene based on the user's position within the VR/AR/MR environment, the user's visual field within the VR/AR/MR environment, or both. Additionally, the size of the high quality image files and the number of the high quality image files may exponentially grow with the size of the VR/AR/MR environment in which the user is permitted to move around in.

Accordingly, embodiments of the present disclosure are generally directed to an imaging system that may preload or cache (e.g., into high-speed data storage) one or more tiles of high quality image data that correspond to regions within a VR/AR/MR environment that a user may potentially navigate through or perceive from a neighboring region. Preloading a tile of high quality image data may enable faster access and transfer of the tile when compared to storing the tile in other storage devices (e.g., non-volatile memory). After preloading the tiles of high quality image data, the imaging system may cause a display device to display a particular tile of the preloaded tiles (e.g., by transmitting the particular tile to the display device) based on user input indicative of a desired direction that the user will proceed through the VR/AR/MR environment or that the user is facing within the VR/AR/MR environment. The imaging system may then cause the display device to display one or more aspects of the corresponding region of the VR/AR/MR environment based on the received tile as the user proceeds in the desired direction toward and within the region of the VR/AR/MR environment or as the user faces the region of the VR/AR/MR environment in the desired direction from a neighboring region. For example, the imaging system may cause the display device to display movie-like scenes or imagery to the user that corresponds to aspects of the region of the VR/AR/MR environment.

As referred to herein, "high quality" image or video data refers to 2D image data, 2D video data, 3D image data, 3D video data, or the like, generated via light field technology, point cloud modeling, voxelization, or the like. In some embodiments, the resolution of the VR/AR/MR environment with the high quality image data is at least 4K pixels (e.g., 3840 pixels×2160 pixels or 4096 pixels×2160 pixels), including 8K pixels (e.g., 7680 pixels×4320 pixels). Additionally, as referred to herein, a "tile" refers to one or more high quality image data files that may be used to present aspects of a particular region of the VR/AR/MR environment to the user on a display device after the imaging system transmits the tile to the display device. For example, the VR/AR/MR environment may be divided into a predetermined number of regions that correspond to respective tiles. Each tile may contain high quality image data that a display device may use to display aspects of the corresponding region of the VR/AR/MR environment. In particular, a tile may be used to display virtual objects of the VR/AR/MR environment, a virtual space above the user, a virtual space below the user, modified portions of the user, or the like, using the display device. In some embodiments, a tile may have at least 1 terabyte (TB) of data, at least 850 megabytes (MBs) of data, at least 750 MBs of data, at least 600 MBs of data, at least 500 MBs of data, or the like.

In one embodiment, the imaging system may cause the display device to display a city-based VR/AR/MR environment, which the user may navigate (e.g., move) through as part of an interactive ride or experience in an amusement park. At the start of the interactive ride, the imaging system may render a tile from a database that corresponds to a default or predetermined region in the city-based VR/AR/MR environment that the user is positioned in. The imaging system may also preload one or more tiles from the database that correspond to respective regions (e.g., neighboring or adjacent regions) in the city-based VR/AR/MR environment that the user may potentially navigate through or perceive from the default region. The regions that correspond to the preloaded tiles may border the default region within the city-based VR/AR/MR environment. The user may be permitted to proceed through such regions after leaving the bounds of the default region, and/or the user may be permitted to perceive such regions while the user is at or near the bounds of the default region. For instance, as the user approaches a virtual or displayed street intersection at the bounds of the default region, the imaging system may render the street intersection and a portion of a first street in a forward direction relative to the user, a portion of a second street in a leftward direction relative to the user, and/or a portion of the second street in a rightward direction relative to the user, based on the tile that corresponds to the default region. The system may then preload tiles from the database corresponding to respective regions past the rendered portions of the first street and the second street.

In response to a user input indicative of a desired direction that the user will proceed through the intersection, the imaging system may cause the display device to display the preloaded tile that corresponds to the region (i.e., selected region) in the desired direction through the intersection (e.g., by transmitting the preloaded tile to the display device). As the user proceeds toward the selected region and navigates within the selected region, the imaging system may cause the display device to present various aspects of the selected region based on the received preloaded tile of high quality image data. Additionally, the imaging system may preload one or more additional tiles from the database that correspond to respective regions in the city-based VR/AR/MR environment that the user may potentially navigate through (e.g., regions that the user may move to next) or perceive from the selected region. The regions that correspond to the preloaded tiles may border the selected region within the city-based VR/AR/MR environment. The user may be permitted to proceed through such additional regions after leaving the bounds of the selected region, and/or the user may be permitted to perceive such additional regions while the user is at or near the bounds of the selected region. In some embodiments, the imaging system may also discard the previously preloaded tiles that correspond to regions in respective directions that the user did not decide to take.

The imaging system may then repeat this process until the user has completed the interactive ride. That is, the imaging system may repeat a process of preloading one or more tiles of high quality image data from a database that correspond to respective regions in a VR/AR/MR environment that the user may potentially navigate through and/or perceive from a neighboring region in the VR/AR/MR environment. After preloading the tiles of high quality image data, the imaging system may cause a display device to display a particular tile of the preloaded tiles based on user input indicative of a desired direction that the user will proceed through the VR/AR/MR environment or that the user is facing within the VR/AR/MR environment (e.g., by transmitting the particular tile to the display device). The imaging system may cause the display device to display corresponding aspects of the region of the VR/AR/MR environment based on the received tile as the user proceeds in the desired direction toward and within the region of the VR/AR/MR environment and/or as the user faces the region of the VR/AR/MR environment in the desired direction from a neighboring region. In this way, the imaging system may process and transmit a smaller amount of high quality image data at multiple times during the interactive ride, rather than processing and loading an entire high quality image dataset (e.g., corresponding to a large number of tiles of high quality image data) at one time. As such, the techniques described herein continually reduce and/or optimize the amount of computing resources that the imaging system uses to provide the user with a seamless experience of the VR/AR/MR environment based on user input indicative of a desired direction of user navigation through the VR/AR/MR environment and/or a desired direction of a user's visual field in the VR/AR/MR environment.

By way of introduction, FIG. 1 is a block diagram of an imaging system 100 that may preload one or more tiles of high quality image data that may be used to display particular aspects of one or more respective regions of a VR/AR/MR environment on a display device 108 accessible by a user, in accordance with embodiments described herein. For example, a control system 102 of the imaging system 100 may retrieve one or more tiles of high quality image data from a database 104 communicatively coupled to the control system 102 via a network 106 and store the tiles in a preloader 103 of the control system 102. The preloader 103 may be any suitable high speed data storage that may preload or cache the tiles of high quality image data from the database 104. For example, the preloader 103 may include a caching device, such as a computer processing unit (CPU) cache device. In some embodiments, the CPU cache device may include L1, L2, or L3 caches. Preloading a tile of high quality image data into the preloader 103 may enable faster access and transfer of the tile when compared to storing the tile in other storage devices (e.g., non-volatile memory). For example, the preloader 103 may have a data transfer speed of at least 10 gigabytes per second (GB/s). In some embodiments, the preloader 103 may have a data transfer speed of at least 25 GB/s, at least 250 GB/s, or at least 1 terabyte per second (TB/s), or the like. Additionally, the preloader 103 may have any suitable size to store an appropriate number of preloaded tiles. In some embodiments, the preloader 103 may have a data storage size of at least 5 TBs, at least 2 TBs, or at least 1 TB, or the like.

The control system 102 may also include a memory 105 and a processor 107. The processor 107 of the control system 102 may include one or more of any suitable type of computer processor or microprocessor capable of executing computer-executable code, including but not limited to one or more field programmable gate arrays (FPGAs), application-specific integrated circuits (ASICs), programmable logic devices (PLDs), programmable logic arrays (PLAs), and the like. The processor 105 may, in some embodiments, include multiple processors. The memory 105 may include any suitable articles of manufacture that serve as media to store processor-executable code, data, and the like. The memory 105 may store non-transitory processor-executable code used by the processor 107 to perform the presently disclosed techniques.

As described above, each tile of high quality image data may be generated via any suitable high quality imaging technique, such as light field technology, point cloud modeling, voxelization, or the like. After a tile of high quality image data has been generated, the tile may be stored in the database 104. In some embodiments, the tile may be indexed in the database 104 with a tile identifier, a region identifier associated with the corresponding region of the VR/AR/MR environment, one or more bordering region identifiers associated with corresponding bordering regions of the VR/AR/MR environment, or the like. The control system 102 may transmit a request to the database 104 with indications of (e.g., pointers to) the tile identifier, the region identifier, and/or the bordering region identifiers, and the database 104 may transmit a response with the corresponding tiles to the control system 102.

The display device 108 may be any suitable device for displaying VR/AR/MR content to the user, such as smart glasses, a virtual retinal display, one or more contact lenses, a computer, a mobile device, a head mounted device, or the like. The display device 108 may optionally have one or more sensors 110 that may acquire data associated with the user and transmit the data, via the network 106, to the control system 102 for analysis. The control system 102 may use the received data associated with the user to determine a direction in which the user is looking (e.g., a particular direction in the user's visual field) or a direction that the user is intending to move (e.g., a desired directional movement of the user). For example, the sensors 110 may include one or more image sensors that may acquire image data or video data associated with the user's eyes, the user's head, the user's limbs, or the like, one or more microphones that may acquire sound data associated with the user, one or more motion sensors (e.g., a velocity sensor, a position sensor, or an accelerometer) that may acquire motion data associated with the user, or the like. In some embodiments, the sensors 110 may be alternatively or additionally attached to the user's body. For example, one or more motion sensors may be disposed on the user's hands, wrists, arms, fingers, legs, feet, torso, or any other suitable body part of the user to acquire motion data of the user. The sensors 110 may alternatively or additionally be disposed in the physical environment of the user. For example, in an interactive ride setting, the sensors 110 may be disposed along a predetermined path the user may physically walk along or within a ride vehicle associated with the user.

After acquiring data associated with the user, the sensors 110 may transmit the data associated with the user to the control system 102 via the network 106 for analysis to determine different types of user input that may be provided by the user to modify the VR/AR/MR environment or otherwise control the user's experience of the VR/AR/MR environment. In some embodiments, the control system 102 may determine a desired directional movement of the user through the VR/AR/MR environment based on an analysis of the data associated with the user, or a desired direction in the visual field of the user in the VR/AR/MR environment based on an analysis of data received from the display device 108. For example, the control system 102 may determine one or more user characteristics, such as a user position (e.g., of the user's eyes, arms, legs, head, or body), a user movement (e.g., of the user's eyes, arms, legs, head, or body), or a user orientation (e.g., of the user's eyes, arms, legs, head, or body (such as a directional tilt, a pitch, a yaw, or a roll)) based on the analysis of the data received from the display device 108. The control system 102 may then determine the desired directional movement of the user or the desired direction in the visual field of the user based on the determined user characteristics. In some embodiments, the control system 102 may compare the determined user characteristics to one or more stored, learned, or otherwise interpretable directional movements of the user or desired directions in the visual fields of the user in a memory accessible by the control system 102. The control system 102 may also use image and/or pattern recognition techniques to determine the user position, the user movement, or the user orientation based on the analysis of the data received from the display device 108. For example, the image and/or pattern recognition techniques or algorithms may include machine learning, artificial intelligence, deep learning, convolutional neural networks, or the like. A memory accessible by the control system 102 may store an image recognition model, a speech recognition model, or the like. Such models may be trained by inputting sample data (e.g., images) of people, such as the user, and indications of user position, user movement, or user orientation in the data. After such models are trained, the control system 102 may then use one or more of the models to determine a particular user position, a particular user movement, or a particular user orientation in data received from the display device 108. The control system 102 may then determine that such determined user characteristics are associated with a desired directional movement of the user or a desired direction in the visual field of the user.

Additionally or alternatively, the control system 102 may receive user input or commands, such as a gesture command from the user, a voice command from the user, or the like, from one or more user input devices 112. For example, the control system 102 may analyze the user input or commands and determine a gesture command or a voice command via image and/or pattern recognition techniques or algorithms, including machine learning, artificial intelligence, deep learning, convolutional neural networks, or the like. For example, a memory accessible by the control system 102 may store an image recognition model, a speech recognition model, or the like. Such models may be trained by inputting sample data (e.g., images or speech) of people, such as the user, and indications of various gesture commands or voice commands in the data. After such models are trained, the control system 102 may then use one or more of the models to determine a particular gesture command or a particular voice command in user input received from the user input devices 112.

Based on the determined user characteristics or user commands, the control system 102 may modify the VR/AR/MR environment perceived by the user accordingly. For example, the control system 102 may cause the display device 108 to display a tile of high quality image data from the preloader 103 based on movement of the user in a physical environment after receiving the tile from the control system 102. The tile of high quality image data may correspond to a region of the VR/AR/MR environment that borders the current region of the VR/AR/MR environment in which the user is virtually located. As the user approaches the bounds of the current region in the VR/AR/MR environment, the control system 102 may cause the display device 108 to present aspects of the region bordering the current region based on the received tile of high quality of image data to provide the user with a continuous experience of the VR/AR/MR environment as the user would experience in the real world. That is, the control system 102 may cause the display device 108 to gradually display certain aspects of the bordering region of the VR/AR/MR environment to the user as the user proceeds toward the bordering region of the VR/AR/MR environment.

Based on the determined user characteristics or user commands, the control system 102 may also preload one or more tiles from the database 104 that the user may potentially navigate through (e.g., regions that the user may move to next) or perceive from a region that the user has virtually moved into. For example, the control system 102 may determine that the user is intending to virtually move in a desired direction toward and/or into a particular region in the VR/AR/MR environment based on the determined user characteristics or commands. Based on the desired direction of the user, the control system 102 may preload one or more tiles that correspond to regions that respectively border the particular region in the VR/AR/MR environment that the user is intending to move toward and/or into.

Additionally, the control system 102 may determine to modify the user's visual field (e.g., viewing angle) of the VR/AR/MR environment displayed via the display device 108 based on the determined user characteristics or user commands. For instance, based on the position of the user's eyes or the movement of the user's eyes, the control system 102 may modify the appearance of the high quality image data displayed via the display device 108 to the user such that the user may perceive the VR/AR/MR environment with a similar visual field as the user would have in the real world. That is, in response to the user changing the user's viewing angle of an object within the VR/AR/MR environment, the control system 102 may modify the appearance of the object in the VR/AR/MR environment similar to how the object would appear in the real world to the user with a similar change in viewing angle, and cause the display device 108 to display the modified appearance.

As shown in the illustrated embodiment, the control system 102 may be communicatively coupled to one or more user input devices 112 associated with the user. For example, the user input devices 112 may include a joystick, a steering wheel, a touchscreen display; one or more input devices of a mobile phone, or any other suitable device for providing user input. In some embodiments, the user input devices 112 may be communicatively coupled to the display device 108.

In any case, the control system 102 may receive one or more user commands from the user input devices 112. After receiving the user commands from the user input devices 112, the control system may modify the VR/AR/MR environment, adjust the user's field of vision of the VR/AR/MR environment, or otherwise control the user's experience of the VR/AR/MR environment based on the received user command. For example, the control system 102 may compare the received user command to one or more stored, learned, or otherwise interpretable user commands in a memory accessible by the control system 102, and modify the VR/AR/MR environment based on the comparison. In some embodiments, the memory may include the memory 105, a read-only memory (ROM) of the control system 102, or the database 104.

It should be noted that any suitable network 106 may be employed in the embodiments described herein. For instance, the network 106 may include any wired or wireless communication network implemented, such as a local area network (LAN), a wide area network (WAN), and the like. The network 106 may enable wired or wireless communication via any suitable communication protocol, such as Wi-Fi, mobile telecommunications protocols (e.g., 2G, 3G, 4G, 5G, Long-Term Evolution (LTE), New Radio (NR)), Bluetooth®, near-field communications protocols, and the like.

Figure 2:
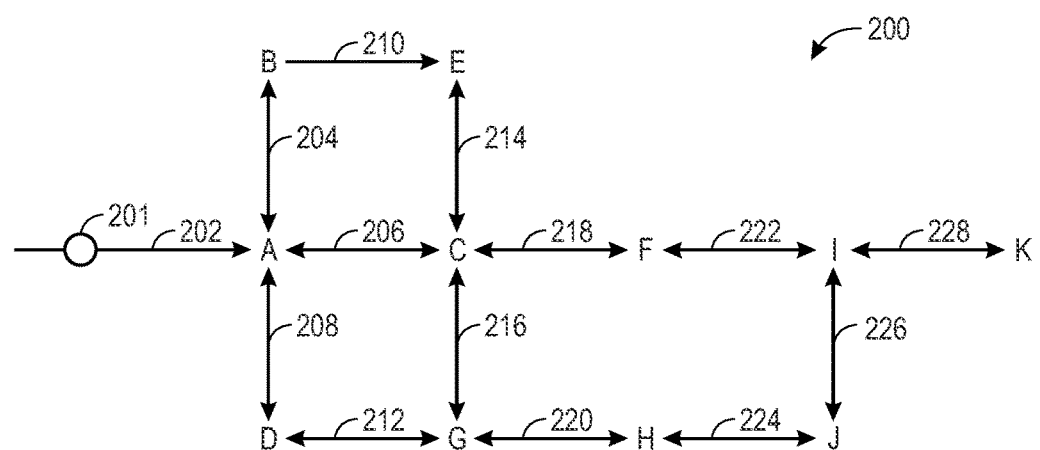
FIG. 2 illustrates a schematic diagram of an exemplary VR/AR/MR environment, in accordance with embodiments described herein.

With the foregoing in mind, FIG. 2 illustrates a schematic diagram 200 of an exemplary VR/AR/MR environment that a user may experience in an interactive ride setting, in accordance with embodiments described herein. In the illustrated embodiment, the schematic diagram 200 of the VR/AR/MR environment may be designed as a city in which the user may navigate between multiple regions of the VR/AR/MR environment (i.e., 202, 204, 206, 208, 210, 212, 214, 216, 218, 220, 222, 224, 226, 228) at designated intersections (i.e., A, B, C, D, E, F, G, H, I, J, K) between the neighboring regions. At the beginning of the interactive ride, the user may begin at a default position 201 in a default region 202 within the VR/AR/MR environment. Although the VR/AR/MR environment is described as a city-based VR/AR/MR environment, it should be understood that such an embodiment is intended to be exemplary and non-limiting. In other embodiments, the VR/AR/MR environment may have any other suitable design, such as a maze, a castle, a forest, outer space, or the like, that may be divided into multiple regions that correspond to tiles of high quality image data. In any case, an intersection in the VR/AR/MR environment may prompt the user to make a decision as to the next region the user will proceed to after passing through the intersection. For example, each intersection may be presented to the user in the VR/AR/MR environment as the user approaches the bounds of the region the user is currently present within. As the user approaches the intersection, the user may provide one or more types of user input to indicate a desired direction that the user will take through the intersection. As described above, the user input may include a physical movement of the user in the desired direction, a gesture command, a voice command, or the like.

During a suitable period of time before the start of the interactive ride or after the start of the interactive ride, the control system 102 of the imaging system 100 may cause the display device 108 to display a tile of high quality image data from the preloader 103 that corresponds to the default region 202 in the city-based VR/AR/MR environment that the user is positioned in (e.g., by transmitting the tile to the display device 108). For instance, after the display device 108 receives the tile of high quality image data, the control system 102 may cause the display device 108 to display various aspects of the default region 202 of the city-based VR/AR/MR environment to the user based on the tile of high quality image data. Such aspects of the default region 202 may include buildings, vehicles, streets, sidewalks, storefronts, the sky, or the like. Also during this period of time, the control system 102 may preload one or more additional tiles of high quality image data from the database 104 into the preloader 103 that correspond to respective regions 204, 206, 208 in the city-based VR/AR/MR environment that the user may potentially proceed into or perceive from the default region 202. That is, the control system 102 may preload regions 204, 206, 208 that border, neighbor, and/or are adjacent to the default region 202 within the city-based VR/AR/MR environment.

In the illustrated embodiment, as the user approaches intersection A at the bounds of the default region 202, the control system 102 may cause the display device 108 to display the intersection A and a portion of a first street in the forward direction relative to the user (i.e., leading to region 206), a portion of a second street in a leftward direction relative to the user (i.e., leading to region 204), and a portion of the second street in a rightward direction relative to the user (i.e., leading to region 208) based on the tile of high quality image data that corresponds to the default region 202. In some embodiments, as the user approaches the bounds of the default region 202 or proceeds into the intersection A, the control system 102 may also cause the display device 108 to gradually display portions of the regions 204, 206, 208 to the user based on corresponding tiles of high quality image data received from the control system 102 to provide the user with a continuous experience of the VR/AR/MR environment. For instance, as the user proceeds towards the center of the intersection A, the control system 102 may cause the display device 108 to display increasing portions of the regions 204, 206, 208 along the first street and the second street based on the distance the user is from the center of the intersection, the visual field of the user (e.g., the direction the user is facing), or the like.

Additionally, the user may be permitted to proceed forward within each region (e.g., as indicated by a single sided arrow), proceed backward within each region (e.g., as indicated by a single sided arrow), or both (e.g., as indicated by a double sided arrow), with respect to the default position 201 of the user in the VR/AR/MR environment. In the illustrated embodiment, for example, the user may be permitted to proceed forward through the region 202 from the default position 201 to the intersection A while the user may be permitted to proceed forward through the region 206 from the intersection A to intersection C and/or backward through the region 206 from intersection C to intersection In some embodiments, the user may be limited to one or more directions of movement based on a storyline of the VR/AR/MR environment. Further, although the schematic diagram 200 of the VR/AR/MR environment is illustrated as a grid, it should be understood that such an embodiment is intended to be exemplary and non-limiting. For example, at a decision point (e.g., an intersection), the user may have more than three or less than three options regarding the user's direction of movement through the decision point. In some embodiments, the user may be permitted to move upward or downward (e.g., virtual stairs or a virtual ramp) in addition to moving leftward, rightward, forward, or backward.

Figure 3:
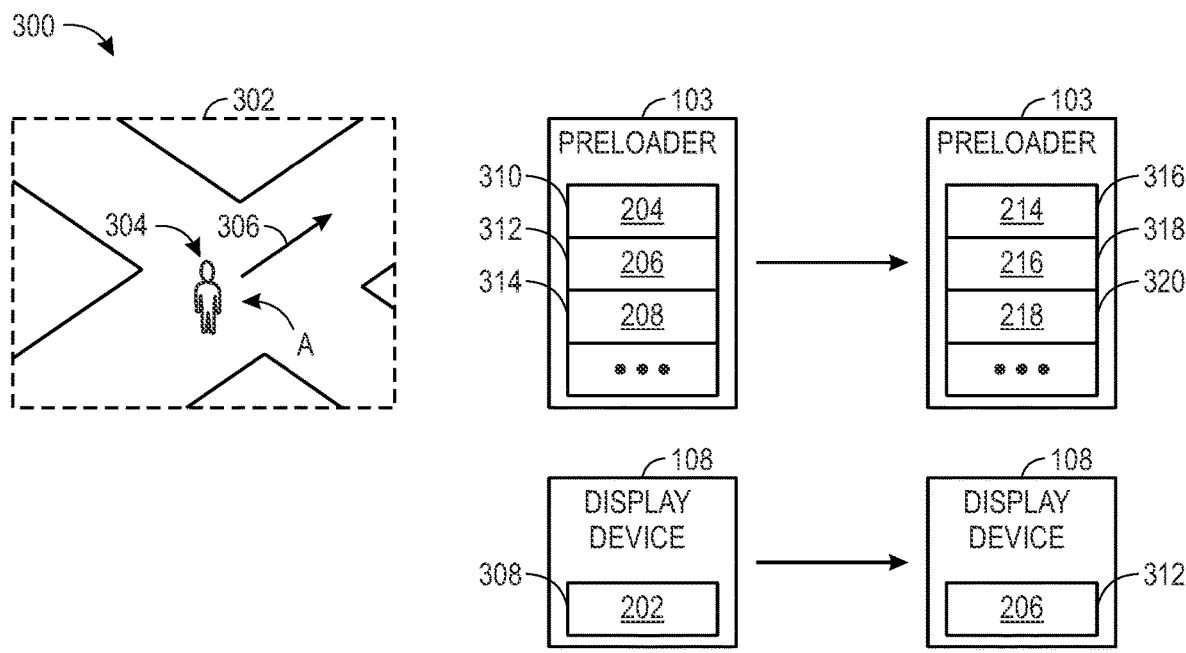
FIG. 3 illustrates a block diagram of a preloader and a display device of the imaging system of FIG. 1 as a user navigates a first set of regions of the exemplary VR/AR/MR environment of FIG. 2, in accordance with embodiments described herein.

With the foregoing in mind, FIG. 3 is a block diagram 300 of the preloader 103 of the control system 102 and the display device 108, in accordance with embodiments described herein. Referring to the example described in FIG. 2 above, as the user 304 approaches intersection A from the default region 202 of the VR/AR/MR environment 302, the control system 102 may cause the display device 108 to display aspects of the default region 202 of the VR/AR/MR environment 302 based on the tile 308 of high quality image data received from the preloader 103 via the control system 102. Additionally, the control system 102 may store tiles (e.g., 310, 312, 314) of high quality image data in the preloader 103 from the database 104 that respectively correspond to regions 204, 206, 208 of the VR/AR/MR environment 302 that the user may potentially navigate through (e.g., regions that the user may move to next) or perceive from the default region 202.

In response to a user input indicative of a forward direction 306 through the intersection A, the control system 102 may transmit the tile 308 of high quality image data from the preloader 103 to the display device 108. The tile 308 of high quality image data corresponds to region 206 of the VR/AR/MR environment that the user will proceed toward in the forward direction from the intersection A. Additionally, the control system 102 may preload one or more additional tiles (e.g., 306, 308, 310) of high quality image data that respectively correspond to regions 214, 216, 218 (e.g., adjacent regions) of the VR/AR/MR environment that the user 404 may potentially navigate through or perceive from the region 206. For example, the control system 102 may receive the additional tiles 306, 308, 310 from the database 104 and store the additional tiles 306, 308, 310 in the preloader 103. In some embodiments, the preloader 103 may discard the unused tiles 310, 314 that correspond to the regions 204, 208 of high quality image data remaining in the preloader 103 before, while, or after receiving the additional tiles 306, 308, 310. That is, the preloader 103 may discard the tiles 310, 314 of high quality image data that were not transmitted to the display device 108 before, while, or after receiving the additional tiles 306, 308, 310. In other embodiments, the preloader 103 may retain certain tiles of high quality image data that correspond to regions 204, 208 that neighbor the region 206 that the user chose to proceed toward and/or based on whether the user is permitted to proceed backward from region 206 to those regions 204, 208. In some embodiments, the preloader 103 also stores tiles corresponding to the regions that the user frequently visits. For example, tiles corresponding to a virtual shop, save point, starting point, and so on, may be stored in the preloader 103, additionally or alternatively to the tiles corresponding to the adjacent regions. In this way, the control system 102 of the imaging system 100 may minimize the retrieval of repetitious data from the database 104.

As the user proceeds toward the bounds of region 202, the control system 102 may cause the display device 108 to display one or more aspects of the region 206 based on the tile 312 of high quality image data received from the preloader 103. In this way, the control system 102 may cause the display device 108 to present certain aspects of the region 206 bordering the region 202 to provide the user with a continuous experience of the VR/AR/MR environment as the user would experience in the real world. That is, the control system 102 may cause the display device 108 to gradually display aspects of the region 206 to the user as the user proceeds toward the region 206 of the VR/AR/MR environment. In some embodiments, the control system 102 may cause the display device 108 to display certain aspects of the region 202 based on the tile 308 of high quality image data until the user has proceeded a threshold distance into the region 206. For instance, the threshold distance may correspond to a real world distance or a theoretical distance that the user may travel before such aspects would typically disappear from sight in the real world. In this way, the control system 108 may simulate the sensory experience that the user would typically receive in the real world. Additionally, in some embodiments, the display device 108 may retain the tile 308 of high quality image data corresponding to the region 202 until the user has proceeded into a region (e.g., 218, 220, 222, 224, 226, or 228) that is not neighboring the region 202 (e.g., for faster and more efficient rendering in case the user returns to the region 202).

Figure 4:
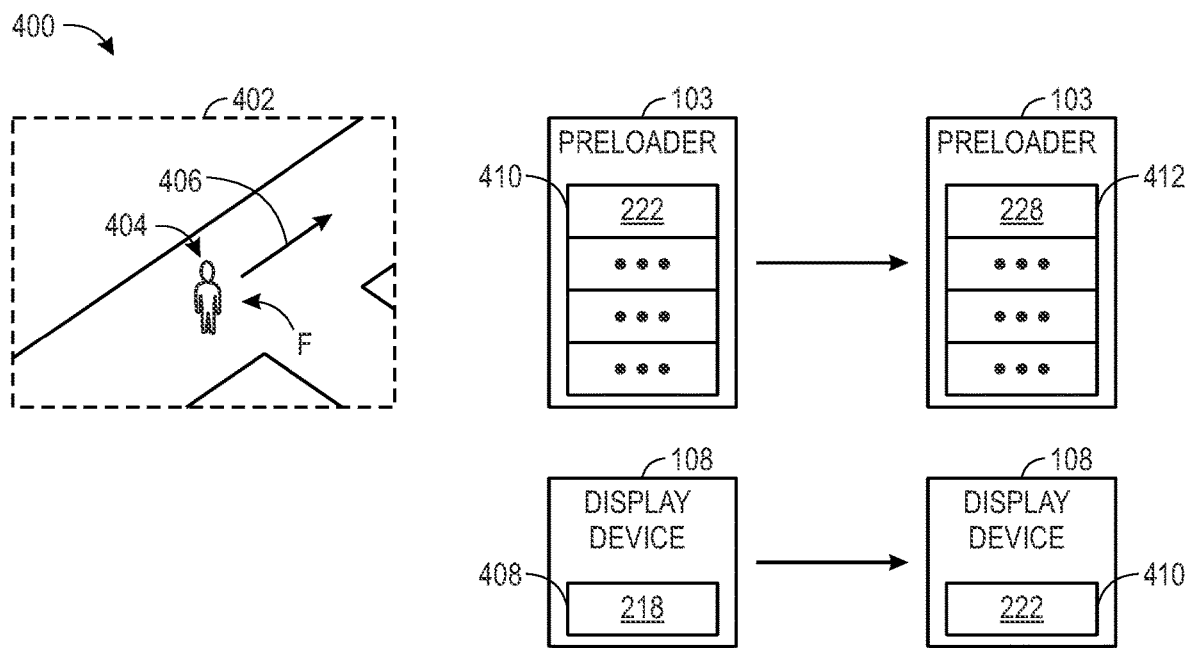
FIG. 4 illustrates a block diagram of the preloader and the display device of the imaging system of FIG. 1 as the user navigates a second set of regions of the exemplary VR/AR/MR environment of FIG. 2, in accordance with embodiments described herein.

Similarly, FIG. 4 is a block diagram 400 of the preloader 103 of the control system 102 and the display device 108 as the user 404 approaches intersection F from the region 218 of the VR/AR/MR environment 402, in accordance with embodiments described herein. As the user 404 approaches intersection F, the control system 102 may cause the display device 108 to display aspects of the region 218 of the VR/AR/MR environment 402 based on the tile 408 of high quality image data received from the preloader 103 via the control system 102. Additionally, the preloader 103 of the control system 102 may store a tile 410 of high quality image data that corresponds to region 222 of the VR/AR/MR environment that the user may potentially navigate through (e.g., a region that the user may move to next) or perceive from the region 218.

In response to a user input indicative of a forward direction 406 that the user will take through the intersection F, the control system 102 may transmit the tile 410 of high quality image data from the preloader 103 to the display device 108. The tile 410 of high quality image data corresponds to region 222 of the VR/AR/MR environment that the user will proceed toward in the forward direction from the intersection F. Additionally, the control system 102 may preload tile 412 of high quality image data that corresponds to region 228 of the VR/AR/MR environment that the user 404 may potentially navigate through or perceive from the region 222. As the user proceeds toward the bounds of the region 218, the control system 102 may cause the display device 108 to begin displaying one or more aspects of the region 222 based on the tile 410 of high quality image data received from the preloader 103. Because the user is not permitted to proceed backward in region 222 toward the intersection F, the control system 102 may discard any copies of tile 408 in the preloader 103 that corresponds to the region 218.

Figure 5:
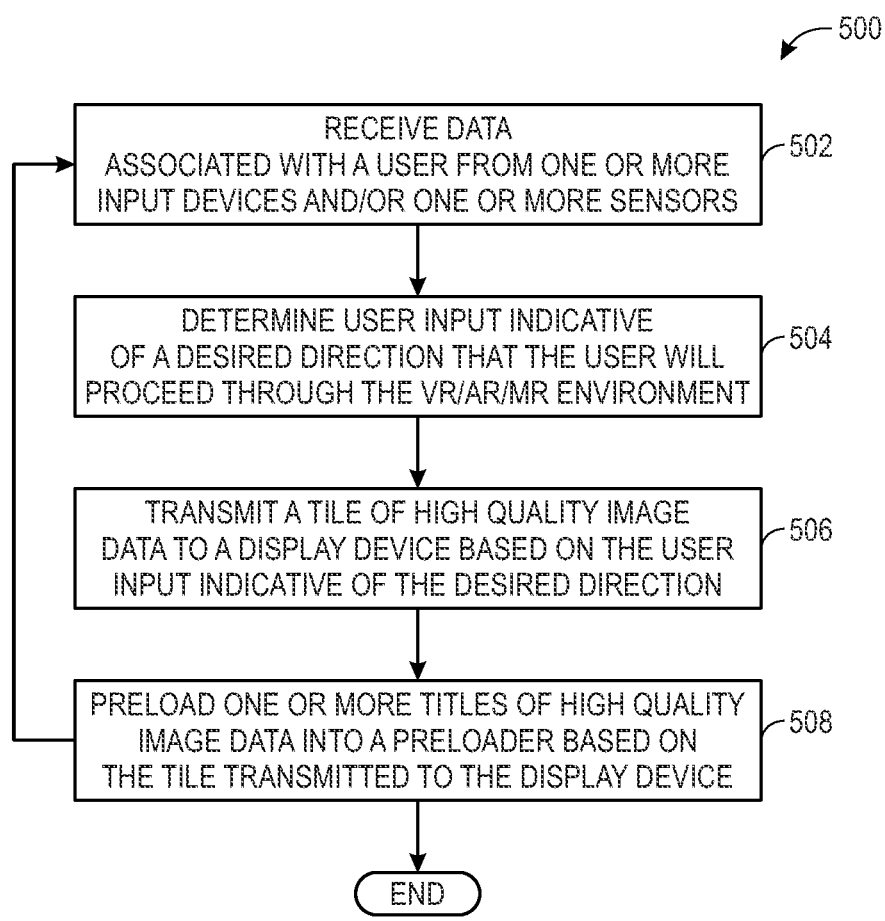
FIG. 5 illustrates a flowchart of a method for displaying high quality image data corresponding to a particular region of a VR/AR/MR environment and preloading high quality image data corresponding to one or more regions bordering the particular region in the preloader, in accordance with embodiments described herein.

With the foregoing in mind, FIG. 5 illustrates a flow chart of a method 500 for preloading one or more tiles of high quality image data that respectively correspond to regions within a VR/AR/MR environment that a user may potentially navigate through or perceive from a neighboring region in the VR/AR/MR environment, and instructing a display device to display a preloaded tile of high quality image data for displaying aspects of a corresponding region of the VR/AR/MR environment based on user input indicative of a desired direction that the user will proceed through the VR/AR/MR environment or that the user is facing within the VR/AR/MR environment, in accordance with embodiments described herein. Although the following description of the method 500 is described in a particular order, it should be noted that the method 500 is not limited to the depicted order, and instead, the method 500 may be performed in any suitable order. Indeed, at least some steps of the method 500 may be skipped altogether. Moreover, although the method 500 is described as being performed by the control system 102 of the imaging system 100, it should be noted that it may be performed by any suitable computing device.

As described above, a user may be navigating through a region of a VR/AR/MR environment during an interactive ride in an amusement park. Referring now to FIG. 5, at block 502, the control system 102 of the imaging system 100 may receive data associated with the user from one or more input devices 112, one or more sensors 110, or both, as the user approaches an intersection at or near the bounds of the region the user is navigating through. For example, the user input devices 112, the sensors 110, or both, may continuously acquire the data associated with the user and transmit the data to the control system 102. After the control system 102 receives the data associated with the user from the input devices 112, the sensors 110, or both, at block 504, the control system 102 may determine that the received data corresponds to a user input indicative of a desired direction that the user is intending to proceed through the intersection. For example, the data associated with the user may include image data or video data associated with the user's eyes, the user's head, the user's limbs, or the like, sound data associated with the user, motion data associated with the user, or the like. The control system 102 may determine one or more user characteristics, such as a position of the user's eyes, arms, legs, head, or body, a movement of the user's eyes, arms, legs, head, or body, or an orientation of the user's eyes, arms, legs, head, or body (e.g., a directional tilt, a pitch, a yaw, or a roll), or user commands, such as a gesture command from the user, a voice command from the user, or the like, based on an analysis of the received data associated with the user. The control system 102 may then determine the desired direction that the user intends to proceed through the intersection based on one or more user characteristics, and/or one or more user commands. For example, the desired direction may be a leftward direction, a rightward direction, a forward direction, an upward direction, a downward direction, or the like. In some embodiments, the control system 102 may determine the desired direction via any suitable image recognition techniques or algorithms, including machine learning, artificial intelligence, deep learning, convolutional neural networks, or the like.

After determining that the received data corresponds to a user input indicative of the desired direction that the user is intending to proceed through the intersection, at block 506, the control system 102 may transmit a tile of high quality image data from the preloader 103 to the display device 108 based on the user input indicative of the desired direction. For example, the tile of high quality image data may correspond to the region in the desired direction through the intersection. As the user proceeds toward the region in the desired direction and navigates within the region, the control system 102 may send a command to cause the display device 108 to present various aspects of the region based on the received tile of high quality image data. For example, the control system 102 may cause the display device 108 to display buildings, vehicles, streets, sidewalks, storefronts, the sky, or the like, using the tile of high quality image data. In some embodiments, the control system 102 may cause the display device 108 to display one or more videos or animations that correspond to a storyline associated with the interactive ride.

At block 508, the control system 102 may preload one or more additional tiles of high quality image data into the preloader 103 based on the tile of high quality image data transmitted to the display device 108 at block 506. For example, the additional tiles of high quality image data may respectively correspond to regions of the VR/AR/MR environment that the user may potentially proceed toward or navigate through from the region in the desired direction through the intersection. In some embodiments, the control system 102 may transmit a request for the additional tiles to the database 104. The request may include one or more identifiers associated with the tile transmitted to the display device 108 at block 506, the region corresponding to the tile transmitted to the display device 108, and/or one or more regions that border the region corresponding to the tile transmitted to the display device 108. In response to receiving the request for the additional tiles, the database 104 may transmit a response with the additional tiles to the control system 102. The control system 102 may then store the additional tiles received from the database 104 in the preloader 103. In some embodiments, the control system 102 may discard unused tiles of high quality image data present in the preloader 103 before storing the additional tiles in the preloader 103.

After preloading the additional tiles into the preloader 103, the control system 102 may repeat the method described above with regard to blocks 502 to 508. That is, the control system may repeat blocks 502 to 508 until the user has completed the interactive ride. In this way, the control system 102 of the imaging system 100 may process and transmit a smaller amount of high quality image data at multiple times during the interactive ride, rather than processing and loading an entire high quality image dataset at one time. As such, the techniques described herein continually reduce and optimize the amount of computing resources that the imaging system 100 uses to provide the user with a seamless experience of the VR/AR/MR environment based on user input indicative of a desired direction of user navigation through the VR/AR/MR environment.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a ride comprising a ride vehicle and a display device; and
one or more processors communicatively coupled to the display device, wherein the one or more processors are configured to:
receive first data from one or more sensors, wherein the first data is indicative of a first location of the ride vehicle within the ride;
cause the display device to display a first set of tiles of image data based on the first data, wherein the first set of tiles is associated with the first location of the ride vehicle;
receive second data from the one or more sensors, wherein the second data is indicative of the ride vehicle moving away from the first location in a first permitted direction of one or more permitted directions;
determine a potential second location of the ride vehicle associated with the first permitted direction, wherein the potential second location corresponds to a second set of tiles of image data; and
preload the second set of tiles of image data into a preloader based on the first permitted direction.

2. The system of claim 1, wherein the first set of tiles and the second set of tiles are generated via light field technology, point cloud modeling, voxelization, or any combination thereof.

3. The system of claim 1, wherein the ride comprises a virtual reality (VR) environment.

4. The system of claim 1, wherein the one or more processors are configured to:
receive third data indicative of the ride vehicle moving away from the potential second location in a second permitted direction of the one or more permitted directions, wherein the second permitted direction is associated with a potential third location corresponding to a third set of tiles of image data; and
discard at least one preloaded tile of the second set of tiles based on the third data.

5. The system of claim 4, wherein the one or more processors are configured to preload the third set of tiles based on the second permitted direction.

6. The system of claim 5, wherein the third set of tiles is associated with one or more physical regions of the ride.

7. The system of claim 6, wherein the one or more physical regions comprises a first physical region within the ride and one or more neighboring physical regions outside one or more bounds of the first physical region.

8. The system of claim 1, wherein the first data is indicative of a visual field within the ride.

9. The system of claim 1, wherein the one or more sensors are disposed throughout the ride.

10. The system of claim 1, wherein the one or more sensors are disposed on the ride vehicle.

11. The system of claim 1, wherein the display device comprises the one or more sensors.

12. A method, comprising:
preloading, via one or more processors, a first set of image data tiles corresponding to a first location of a ride vehicle within a ride, wherein the ride comprises a virtual reality (VR) environment or an augmented reality (AR) environment;
transmitting, via the one or more processors, the first set of image data tiles to a display device associated with the ride;
receiving, via the one or more processors, sensor data from one or more sensors indicative of the ride vehicle moving away from the first location in a first permitted direction of one or more permitted directions;
determining, via the one or more processors, a potential second location associated with the first permitted direction, wherein the potential second location corresponds to a second set of image data tiles; and
preloading, via the one or more processors, the second set of image data tiles into the preloader based on the first permitted direction.

13. The method of claim 12, comprising:
receiving, via the one or more processors, additional sensor data indicative of the ride vehicle moving away from the potential second location in a second permitted direction of the one or more permitted directions;
determining, via the one or more processors, that the second permitted direction corresponds to a potential third location of the ride, wherein the potential third location corresponds to a third set of image data tiles;

preloading, via the one or more processors, the third set of image data tiles into the preloader; and deleting, via the one or more processors, one or more tiles of the second set of image data tiles based on a lack of permission to move backward through the ride.

14. The method of claim 13, wherein the first set of image data tiles, the second set of image data tiles, and the third set of image data tiles are generated via light field technology, point cloud modeling, voxelization, or a combination thereof.

15. The method of claim 12, wherein the one or more sensors are disposed throughout the ride.

16. The method of claim 12, wherein the one or more sensors are disposed on the ride vehicle.

17. The method of claim 12, wherein the one or more permitted directions comprise a plurality of permitted directions.

18. A non-transitory, tangible, computer-readable medium, comprising instructions that, when executed by one or more processors, cause the one or more processors to:

receive a first indication of a first location of a ride vehicle within a ride from one or more sensors, wherein the ride comprises a virtual reality (VR) environment, an augmented reality (AR) environment, or a mixed reality (MR) environment;

transmit a tile of image data associated with the first location to a display device, wherein the tile corresponds to a scene for display in the VR environment, the AR environment, or the MR environment;

receive, from the one or more sensors, a second indication of the ride vehicle moving away from the first location in a first permitted direction of one or more permitted directions, wherein the first permitted direction is associated with a potential second location; and preload one or more additional tiles of image data associated with the potential second location based on the first permitted direction.

19. The non-transitory, tangible, computer-readable medium of claim 18, wherein the one or more additional tiles associated with the potential second location comprise each neighboring tile that borders the tile.

20. The non-transitory, tangible, computer-readable medium of claim 18, wherein the tile and the one or more additional tiles are generated via light field technology, point cloud modeling, voxelization, or any combination thereof.

* * * * *